C. M. SMITH.
DETACHABLE EMERGENCY TIRE.
APPLICATION FILED JULY 3, 1919.

1,332,416.

Patented Mar. 2, 1920.

Inventor:
C. M. Smith.

UNITED STATES PATENT OFFICE.

CHARLES M. SMITH, OF VAN WERT, OHIO.

DETACHABLE EMERGENCY-TIRE.

1,332,416.        Specification of Letters Patent.        Patented Mar. 2, 1920.

Application filed July 3, 1919. Serial No. 308,417.

*To all whom it may concern:*

Be it known that I, CHARLES M. SMITH, a citizen of the United States, residing at Van Wert, in the county of Van Wert and State of Ohio, have invented certain new and useful Improvements in Detachable Emergency-Tires, of which the following is a specification, reference being had therein to the accompanying drawings.

This invention relates to an emergency tire, and has for its object the production of a simple and efficient tire that can be quickly placed upon the rim of a wheel, when a pneumatic tire has been punctured or otherwise injured so that it is not practical to use the same, thereby preventing injury to the pneumatic tire by the removal of the same and the placing on the rim of one of my emergency tires.

With this and other objects in view, my invention comprises certain novel constructions, combinations, and arrangements of parts as will be hereinafter specifically described, illustrated in the accompanying drawings, and more particularly pointed out in the appended claims.

In the drawings,

Figure 1 is a view in side elevation of a wheel showing my improved emergency tire thereon, partly in section, while

Figure 1:
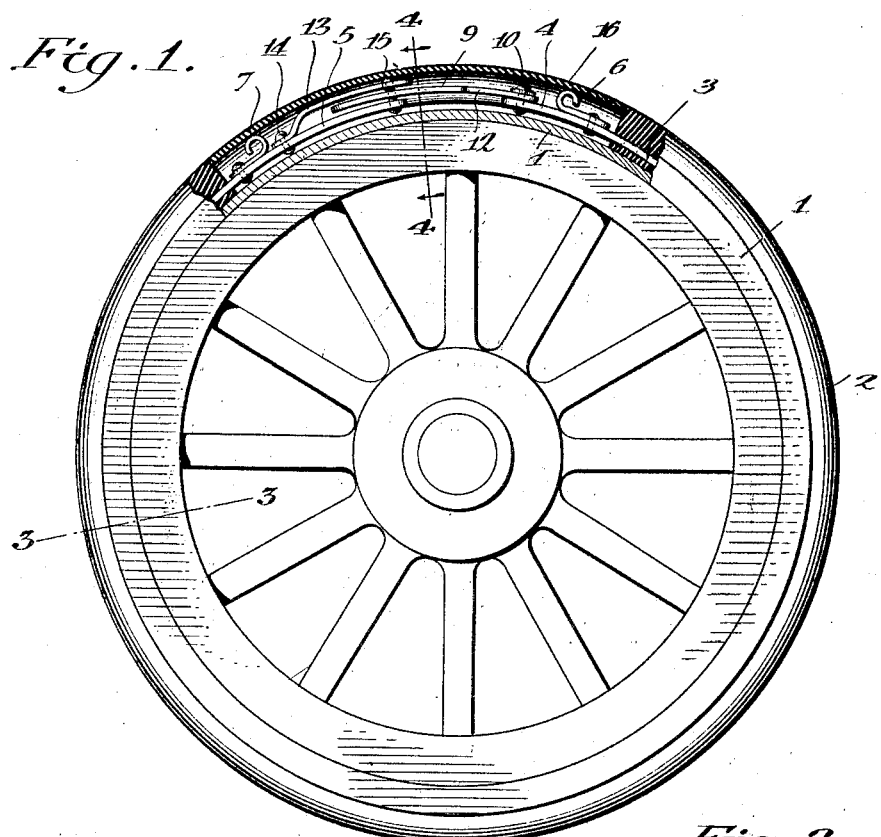

Referring to the drawings by numerals, 1 designates the rim of a wheel, and 2 the rubber body of my emergency tire, in which body is embedded or molded a metal strip or band 3.

Figure 2:
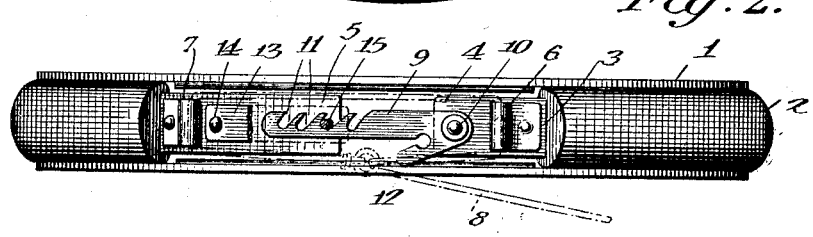
Fig. 2 is a plan view of my emergency tire on a rim with the cover for the connecting device removed.
Figure 3:
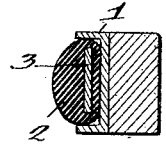
Fig. 3 is a section taken on line 3—3, Fig. 1.

The band 3 is provided with a primary end 4 and an auxiliary end 5. Secured upon the outer face of the primary end, near to the end of the body 2, is a primary hook 6, and secured to the auxiliary end 5, near the end of the body 2, is an auxiliary hook 7. These hooks 6 and 7 are provided for receiving a suitable instrument or tool, as indicated by dotted lines 8 (Fig. 2), for drawing the ends of the band 3 together for allowing the connecting device to be successfully operated for fastening the ends of the emergency tire together, and thereby retaining said tire upon the rim 1.

The connecting device comprises a latch 9 which is pivotally mounted at 10 upon the outer face of the primary end 4 of band 3, and this latch 9 is provided with a plurality of notches 11 and with an angularly disposed extension 12. The extension 12 is provided for a grip, whereby the operator is enabled to swing the latch 9 upon its pivot 10.

A yieldable or springy, angular finger 13 is fastened at 14 to the outer face of the auxiliary end 5, this finger up-standing a suitable distance to allow the outer end of the latch 9 to be placed thereunder (Fig. 1), and a rivet 15 is passed through the outer end of finger 13 and through the outer end of auxiliary end 5 for entering the notches 11 of the latch 9 to hold the latch 9 in an assembled position under the finger 13. By reason of the finger 13 being slightly resilient, the rivet 15 has a sliding movement through the auxiliary end 5 so as to better accommodate the latch 9, in adjusting the latch to cause the rivet 15 to be placed in the most preferred notch 11, for producing a tight adjustment of the emergency tire upon the rim, as I have found from practical experience that a device constructed in accordance with the present invention, as per the preferred embodiment shown in the accompanying drawings and herein described.

Figure 4:
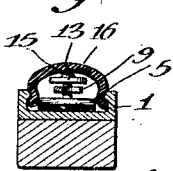
Fig. 4 is a section taken on line 4—4, Fig. 1, looking in the direction of the arrows.

The connecting device only occupies a relatively small portion of the length of the emergency tire, and to protect this connecting device, I preferably use a stiff cover 16 of rubber (Fig. 4), that can be pressed down into the rim, and by reason of the pressing being inward as the wheel revolves, this cover 16 will be held in place until the destination is reached and the emergency tire removed.

From the foregoing description, it will be understood that certain minor changes or alterations may be made in the manufacture of my invention on a large scale, and, therefore, I reserve the right to make such minor alterations or changes as shall appear to one skilled in the art to which this invention relates, and which fall within the scope of the appended claims.

What I claim is:

1. In an emergency tire, the combination with a body, of a flat band embedded in the body and projecting beyond its ends, said band provided with a primary and an auxiliary end, a latch provided with notches and with an angular extension pivotally secured to the upper face of the primary end, an angular resilient finger secured to the auxiliary end, a rivet extending through the outer end of the auxiliary end and having a sliding movement upon the auxiliary end, and said latch positioned under the resilient finger and adapted to be adjusted under the finger for permitting the rivet to enter the notches on the latch for securing the primary and auxiliary ends close together when the tire is assembled upon a rim.

2. In an emergency tire, the combination with a body, of a flat band extending through the body and provided with primary and auxiliary ends, flat hooks resting upon the outer face of the band and fastened thereto near the ends of the body, a curved flat latch pivotally secured to the primary end contiguous to the hook carried thereby, said latch provided on one edge with a plurality of notches and having on its opposite edge an angularly-disposed extension constituting a grip, a resilient, angular finger having its inner end secured to the outer face of the auxiliary end of the band contiguous to the hook carried by the auxiliary end, said finger extending beyond the outer end of the auxiliary end, and a rivet extending through the finger and auxiliary end near their outer ends and having a slight sliding movement upon the auxiliary end for allowing ready adjustment of the latch between the auxiliary end and the finger for permitting the rivet to readily enter any one of the notches on the latch, substantially as shown and described.

In testimony whereof I hereunto affix my signature.

CHARLES M. SMITH.